United States Patent [19]
Lowry

[11] Patent Number: 5,776,315
[45] Date of Patent: Jul. 7, 1998

[54] OIL RECLAMATION DEVICE

[75] Inventor: Charles Andrew Lowry, 937 Well Spring Rd. #25M, Midvale, Utah 84047

[73] Assignee: Charles Andrew Lowry, Salt Lake City, Utah

[21] Appl. No.: 845,309

[22] Filed: Apr. 9, 1997

[51] Int. Cl.$^6$ .............................. C10C 1/20; B01D 1/00; C10G 1/10

[52] U.S. Cl. .................. 196/46.1; 196/111; 196/120; 196/121; 196/128

[58] Field of Search ................... 196/46.1, 111, 196/120, 121, 128; 210/180, 184, 323.1; 208/179

[56] References Cited

U.S. PATENT DOCUMENTS

| | | | |
|---|---|---|---|
| 2,839,196 | 6/1958 | Schwalge | 210/180 |
| 4,146,475 | 3/1979 | Forsland | 210/71 |
| 4,289,583 | 9/1981 | Engel | 196/116 |
| 4,354,946 | 10/1982 | Warlick et al. | 210/774 |
| 4,443,334 | 4/1984 | Shugarman et al. | 210/168 |
| 4,830,745 | 5/1989 | Meulen | 210/168 |
| 4,943,352 | 7/1990 | LeFebvre | 196/46.1 |
| 5,242,034 | 9/1993 | DePaul | 184/6.22 |
| 5,322,596 | 6/1994 | Arutz | 196/46.1 |
| 5,630,912 | 5/1997 | LeFebvre | 196/115 |
| 5,630,956 | 5/1997 | Lynch | 210/180 |
| 5,639,965 | 6/1997 | Meyer | 73/216 |

*Primary Examiner*—Nina Bhat

[57] ABSTRACT

An improved oil reclamation device for removing contaminates from lubricating oils and hydraulic fluids. A first feature of this oil reclamation device an improved utilization of space, which provides the benefit of a compact installation. Another benefit of this design is an efficient design of the second chamber, which virtually eliminates cold spots and vapor condensation. Another benefit of this design is the efficient use of operating oil to heat the evaporation surface evenly and effectively without the need of any additional heat source. This design eliminates cold spots on the evaporation surface and the need for potentially dangerous heating elements. A further benefit of this design is an oil metering system which is highly resistant to clogging and easily serviced.

3 Claims, 8 Drawing Sheets

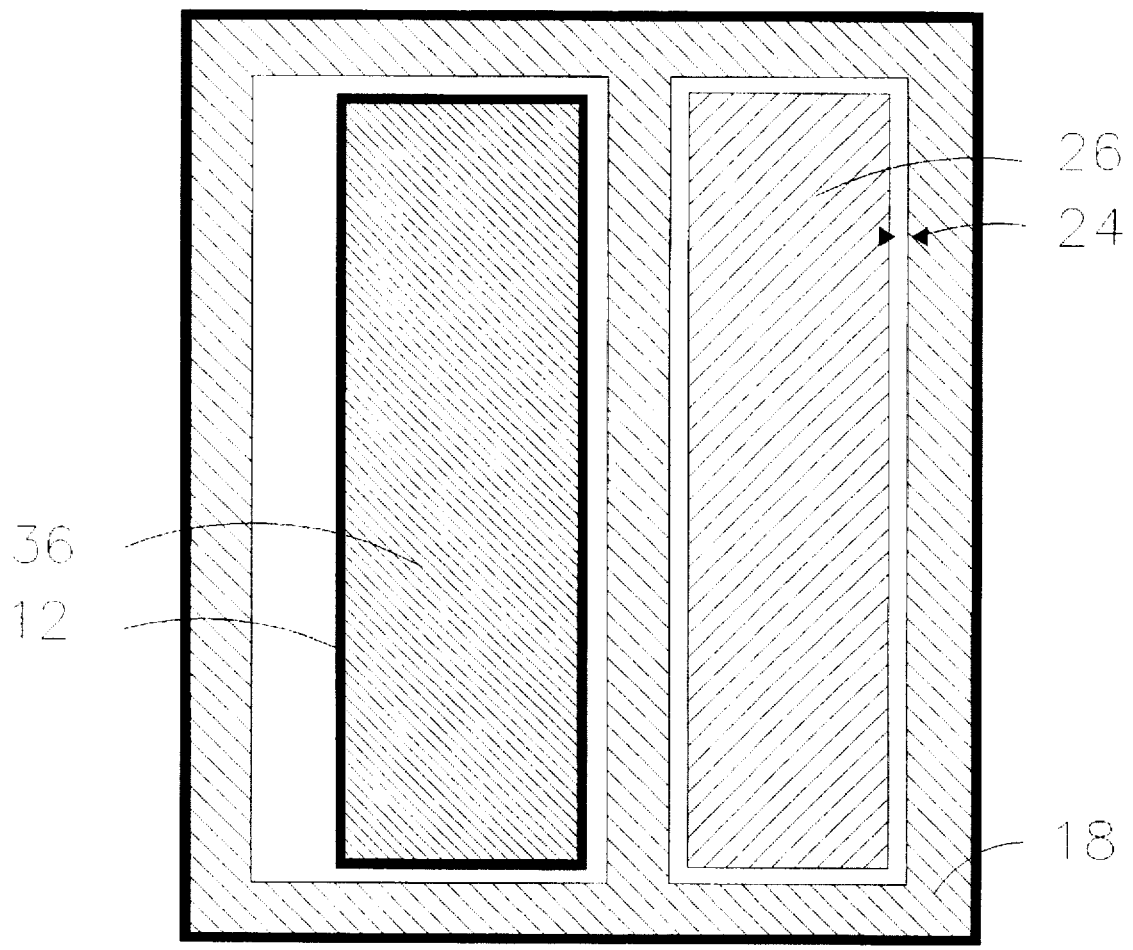

OIL RECLAMATION DEVICE

FIELD OF THIS OIL RECLAMATION DEVICE

This disclosure generally relates to an oil filtration and reconditioning device used on internal combustion engines and in particular to an improved device utilizing a unique combination second chamber for evaporation of volatiles and first chamber for optional filtering of contaminates.

BACKGROUND OF THIS OIL RECLAMATION DEVICE

An improved oil reclamation device for removing impurities from lubricating oils and hydraulic fluids. More particularly, this oil reclamation device relates to a unique housing and oil metering assembly.

Oil reclamation devices of the general type disclosed and described are well known. These devices are used to remove contaminates from lubricating oil. Liquid contaminants such as condensates, water, and fuel are often emulsified in the lubricating oil and cannot be easily removed by a filter. It is therefore necessary that the lubricating oil of all internal combustion engines be changed at sufficiently regular intervals to minimize engine damage caused by these contaminants.

A number of devices have been proposed to remedy this problem while providing increased oil filtration. The following patents disclose the general state of the refining art: U.S. Pat. Nos. 2,839,196; 4,146,475; 4,289,583; 4,830,745; 4,943,352; 5,322,596.

Numerous disadvantages are associated with these known devices. Primarily, all the above devices use large, bulky evaporation chambers with massive central hubs and protruding bosses, which assembly is highly wasteful both in space and heat retention efficiency thus making these units unsuitable for a wide variety of oil refining applications.

"Lefebvre" U.S. Pat. No. 4,943,352, "Arntz" U.S. Pat. No. 5,322,596, "Schwalge" U.S. Pat. No. 2,635,759 and "Morey" U.S. Pat. No. 2,472,717 all illustrate bulky, heat inefficient evaporation chambers. These designs and all other discovered relevant prior art exposes a large percentage of the walls of their evaporation chambers to the surrounding environment, promoting enormous heat loss which produces vapor condensation inside these evaporation chambers. Condensation occurs due to the greatly reduced temperature of the chamber walls as compared to the vapor, as a result of cooling caused by the large heat loss to the environment outside of these evaporation chambers. This condensate is not vaporized off but drains back into to the oil thus drastically reducing efficiency.

"Liddel" U.S. Pat. No. 1,613,467 discloses an oil filtration system incorporating "inlet and outlet ports, supply and discharge conduits communicating with said inlet and outlet ports respectively, a by-pass between said conduits, a relief valve controlling said by-pass and arranged to permit flow from said supply to said discharge conduit when a predetermined pressure difference exist between fluid in said conduits". This design does not address the removal of fuel, water, and condensation contamination. Therefore this device is not applicable to the invention disclosed in this patent.

"Yano" U.S. Pat. No. 4,997,556 discloses an "oil filter comprising a housing for removing solid contaminates from the oil and a second separator unit for removing gaseous contaminates." This separator unit consist of a "chamber arranged to generate a vortical flow of the oil introduced thereof to thereby separate gas-rich oil which gathers in an axially central portion of the chamber, a first outlet for discharging the gas-rich oil and a second outlet for the oil containing little gaseous contaminates". This design also does not address the removal of fuel, water, and condensation contamination. Therefore this device is not applicable to the invention disclosed in this patent.

There remains a need for an oil reclamation device which incorporates a heat and space efficient evaporator apparatus. However, at the time the present oil reclamation device was made, it was not obvious to those of ordinary skill in the art how those needs could be fulfilled, in view of the prior art as a whole.

SUMMARY OF THIS OIL RECLAMATION DEVICE

The long-standing but heretofore unfulfilled need for a heat and space efficient oil reclamation device is now fulfilled by a construction that comprises a housing comprising a base, at least one sidewall, and a releasable lid. The one or more sidewalls, the base and the lid form a first chamber. Within this first chamber is a second chamber, which is comprised of at least one second chamber sidewall.

The lid further comprises a projection, having a sidewall which projects parallel to and adjacent the second chamber sidewall.

The sidewall of the lid and the sidewall of the second chamber combine to form an oil metering orifice.

The width and length of this oil metering orifice is set to such dimensions so as to restrict the flow of oil to within predetermined limits.

The region of the housing which includes the first chamber but not the second chamber may alternately be referred to as the filter chamber. This filter chamber may optionally contain an oil filter. The region of the second chamber may alternately be referred to as the evaporation chamber.

The oil, upon entering the housing, flows through the filter chamber toward the oil metering orifice. A filter may optionally be placed in the filter housing, through which the oil flows while passing through the oil inlet into the filter chamber into which oil then flows. The oil then travels to the oil metering orifice.

The oil metering orifice provides passage from the first (filter) chamber into the second (evaporation) chamber, while simultaneously metering the flow of oil into the evaporation chamber.

The oil, upon entering the evaporation chamber, flows onto the surface of the second chamber sidewall, spreading into a thin film which facilitates the release of volatiles from within the oil.

The design of this novel apparatus constrains oil entering the unit to flow first through the filter chamber and secondly through the evaporation chamber.

Thus it is understood that a primary object of this oil reclamation device is to advance the art of oil reclamation units by providing a more effective utilization of space through an efficient combination of filter and evaporation chambers. Another object of this oil reclamation device is an uncomplicated evaporation means.

These and other important objects, features and advantages of this oil reclamation device will become apparent as this description proceeds.

This oil reclamation device accordingly comprises the features of construction, combination of elements and arrangement of parts that will be exemplified in the construction hereinafter set forth, and the scope of this oil reclamation device will be indicated in the claims.

BRIEF DESCRIPTION OF THE DRAWINGS

Other objects of this oil reclamation device will appear in the following description and appended claims, reference being made to FIGS. 1–10 forming a part of the specification wherein like reference characters designate corresponding parts.

FIG. 10 is a horizontal sectional view of this oil reclamation device, said view being taken along line 3—3 of FIG. 9.

LIST OF REFERENCE NUMERALS

10 Oil Reclamation Device.
12 First Chamber.
14 Second Chamber.
16 Base.
18 Housing.
20 Drain.
22 Inlet.
24 Oil metering orifice.
26 Projection.
28 Vent.
30 First Chamber Sidewall.
32 Lid Releasable Attachment.
34 Lid.
36 Filter.
Second Chamber Sidewall.

DETAILED DESCRIPTION OF SPECIFIC EMBODIMENTS

The preferred embodiment and best mode of this oil reclamation device is shown by FIGS. 1–7. Alternate embodiments are illustrated by FIGS. 8–10.

Figure 1:
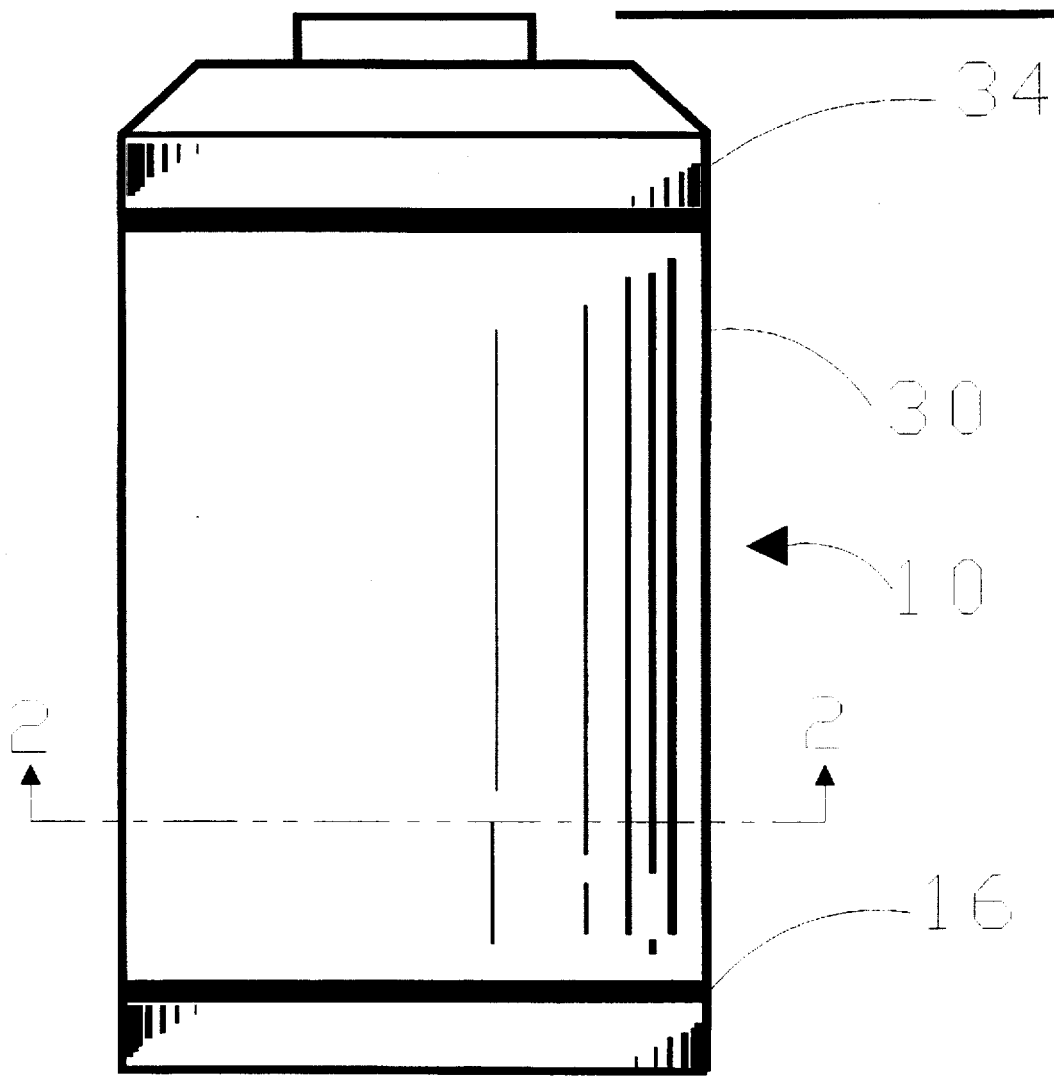
FIG. 1 shows a front view of this oil reclamation device.
Figure 2:
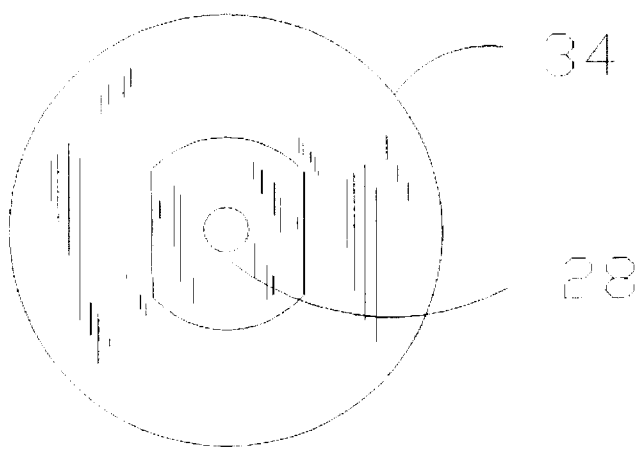
FIG. 2 shows a top plan view of this oil reclamation device.
Figure 3:
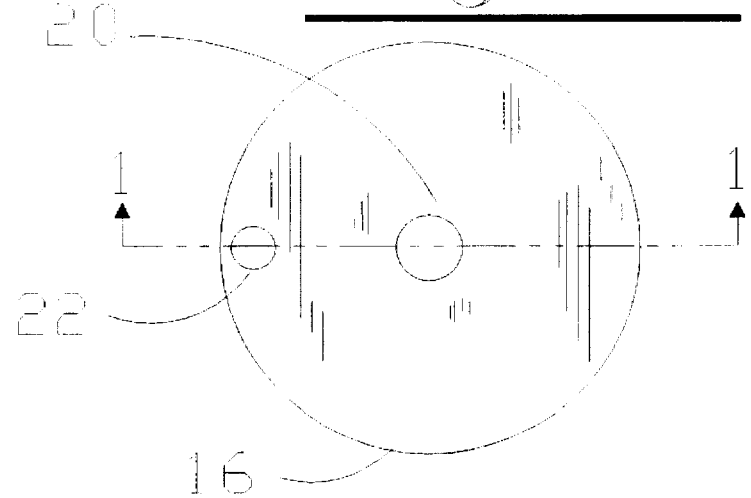
FIG. 3 shows a bottom plan view of this oil reclamation device.
Figure 4:
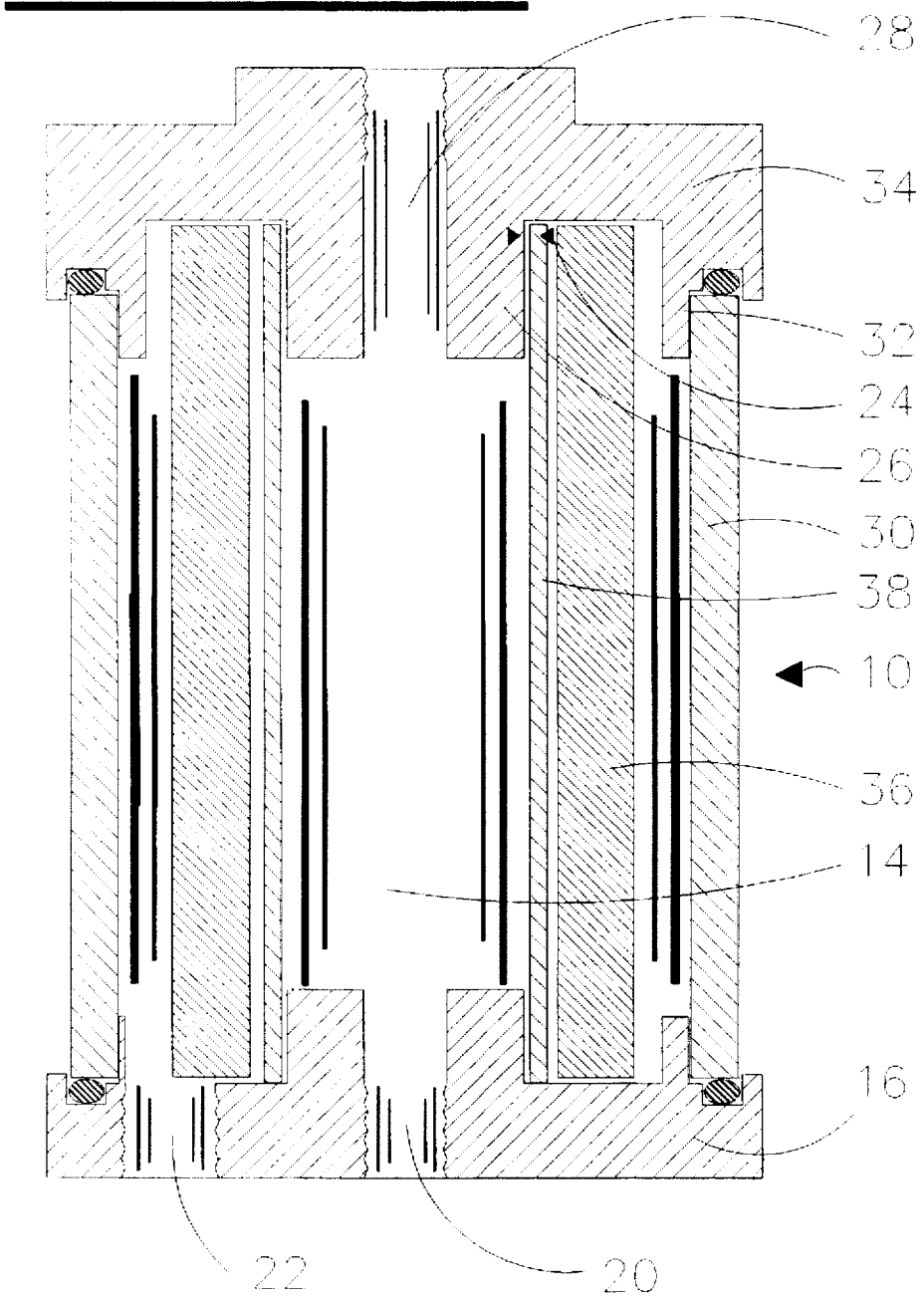
FIG. 4 shows a longitudinal sectional view of the preferred embodiment of this oil reclamation device, said view being taken along line 1—1 in FIG. 3.
Figure 5:
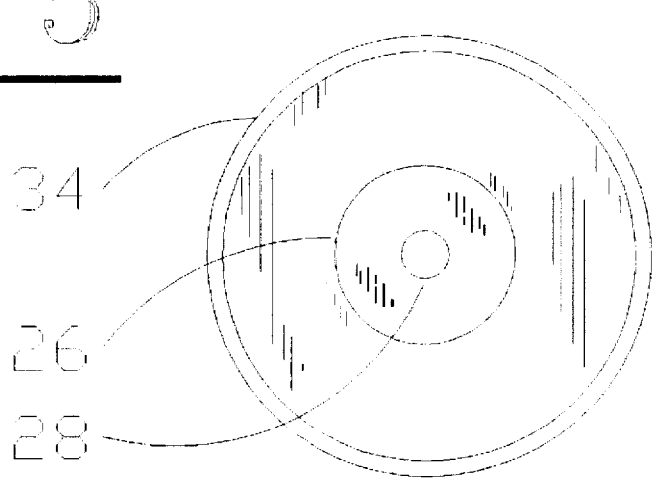
FIG. 5 shows a bottom plan view of the lid.
Figure 6:
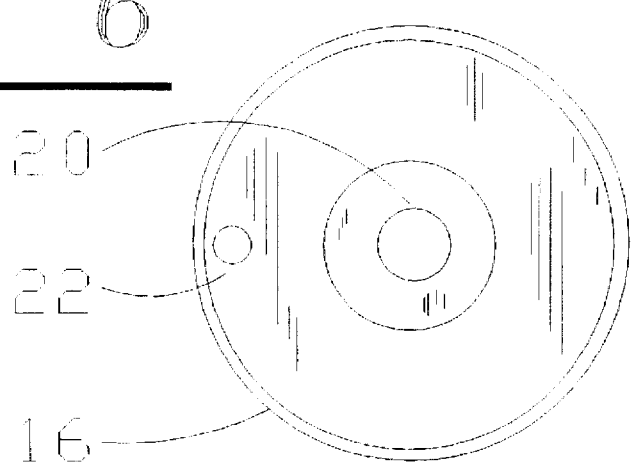
FIG. 6 shows a top plan view of the base.
Figure 7:
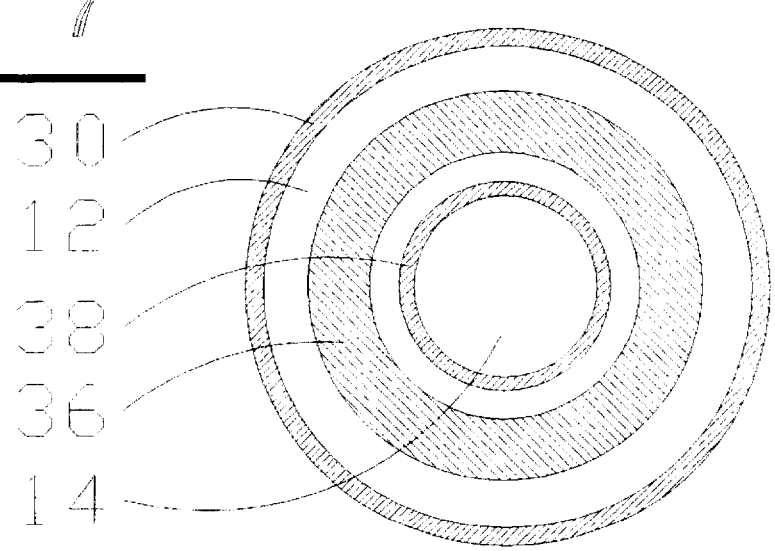
FIG. 7 is a horizontal sectional view of this oil reclamation device, said view being taken along line 2—2 of FIG. 1.

Referring now to FIG. 1 and 4, it will there be seen that an exemplary embodiment of the present oil reclamation device is denoted as a whole by the reference numeral 10.

The oil refiner device consist primarily of a housing which embodies a first chamber, a second chamber, a base and a lid, with the lid releasably attached. The resultant construction somewhat resembles a Thermos jar.

Figure 8:
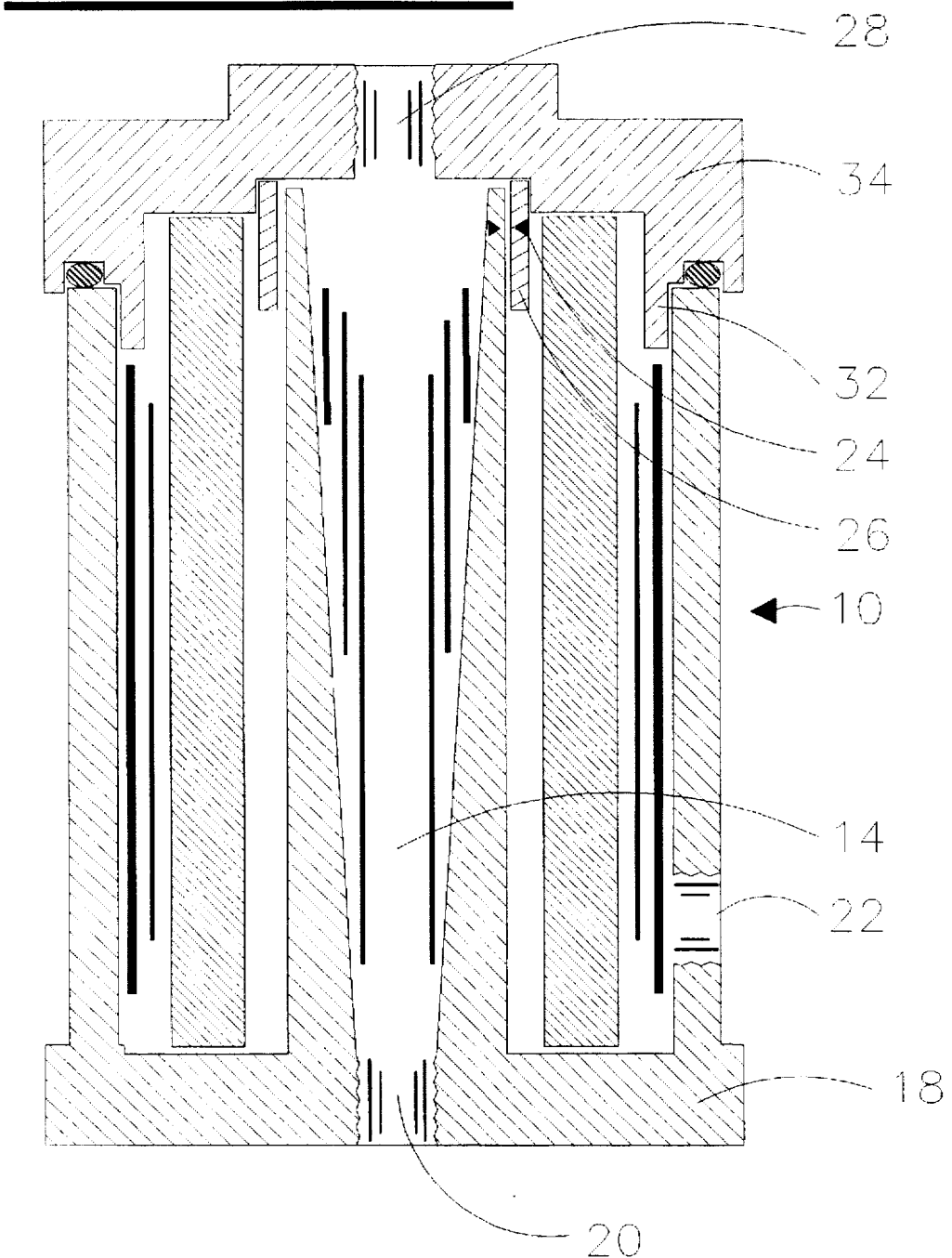
FIG. 8 is a longitudinal sectional view of an alternate embodiment made in accordance with this oil reclamation device, said view being taken along line 1—1 of FIG. 3.
Figure 9:
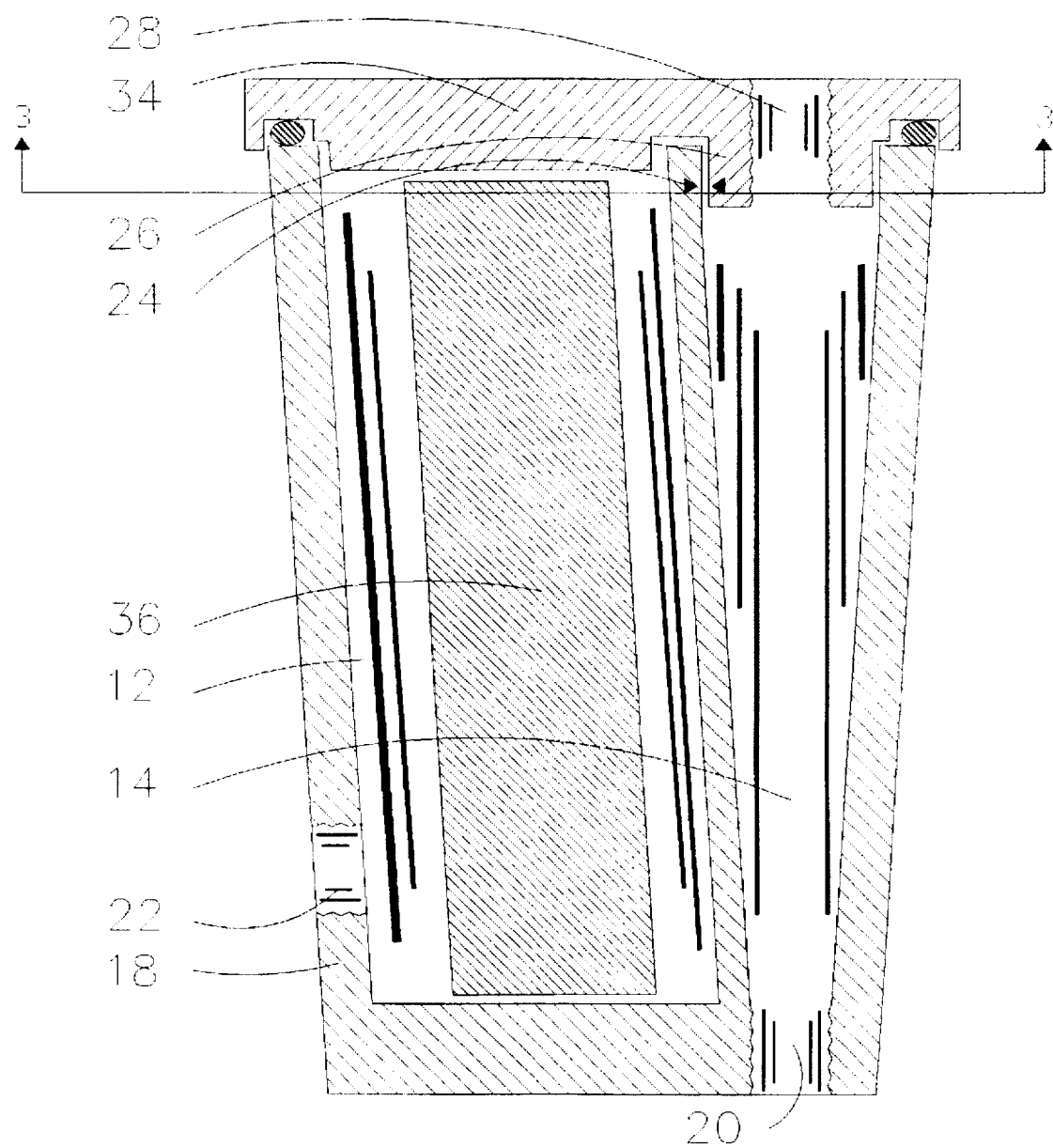
FIG. 9 is a longitudinal sectional view of an alternate embodiment made in accordance with this oil reclamation.

Referring to FIGS. 4, 8 and 9 we notice that within this housing is at least one second chamber sidewall. This second chamber sidewall effectively divides the internal space of the housing into two regions, the first chamber and second chamber.

The first chamber is the region between the sidewall or sidewalls and the second sidewall or sidewalls, the lid being the upper limit thereof and the base the lower limit thereof. The first chamber may optionally contain an oil filter element and is supplied with oil by the inlet.

If oil filtration is desired, then many different types of filter elements and filtration ratings may be used, including but not limited to cartridges of spun or pleated polypropylene, polyester, resin-bonded cellulose melamine, wire mesh, cotton, ceramic, sintered bronze, or electrostatic. The device may also be operated without the use of any filter whatsoever. This versatility makes this oil reclamation device more well suited to specific customer applications.

The filter may require certain sealing methods, such as but not limited to rubber washers, o-rings, pressed fittings, and the like. This and other similar filter sealing technologies are well known and well within the scope and design of this oil reclamation device.

Referring to FIGS. 4, 8, and 9 the region designated the second chamber is the region within the second sidewall or sidewalls. The second chamber includes the drain and vent. The drain provides an outlet passage for the oil to exit the housing and the vent provides a passageway for vaporized contaminates to exit the housing.

In the preferred embodiment, the oil metering orifice meters the oil flow to a rate between 1 and 200 gallons per hour, although other flow rates are within the scope of this oil reclamation device.

FIGS. 8 and 9 illustrate an alternate embodiment of this oil reclamation device wherein the above stated embodiments may be brought together in elements and construction so as to provide diversity in the shape, size and method of construction of the oil reclamation device. This diversity is necessary and intentional in order to construct oil reclamation devices specific to the needs of the user.

DESCRIPTION OF OPERATION

The preferred embodiment and best mode of this oil reclamation device are shown by FIGS. 1–7. Alternate embodiments are shown in FIGS. 8–10.

In operation, the contaminated oil enters the oil reclamation device under pressure by way of the inlet, which oil then passes into the first chamber. Within the first chamber may optionally be installed a filter. If a filter is installed, the oil introduced at the inlet would pass through the filter before proceeding to the oil metering orifice. The oil metering orifice provides a passage for oil to travel from the first chamber to the second chamber. The oil flow rate through the oil metering orifice is varied by changing the gap between the lid sidewall and the second chamber sidewall, the length the lid sidewall and second sidewall lie adjacent, or both. The oil, upon entering the second chamber, forms a thin film upon the surface of the second sidewall or sidewalls and flows to the drain, whereupon said oil exits the housing. While the oil is in a thin film, some of the volatiles within the oil vaporize and exit through the vent.

A thin film is preferable for vaporization of volatiles because a thin film provides a large surface to volume ratio, which consequently provides more oil surface for the passage of volatiles within a set volume of oil to the surrounding environment.

Although the construction of the alternate embodiments is somewhat different than the preferred embodiment, the description of the operation of the alternate embodiments is identical to the preferred embodiment in concept and function.

While the operation and description of this oil reclamation device has been addressed in terms of oil purification, the term oil includes hydraulic fluid or any other lubricant or fluid which requires refinement to maintain its original purpose.

This oil reclamation device is clearly new and useful. Moreover, it was not obvious to those of ordinary skill in the art at the time it was made, in view of the prior art considered as a whole as required by law.

It will thus be seen that the objects set forth above, and those made apparent from the foregoing description, are efficiently attained and since certain changes may be made in the above construction without departing from the scope of this oil reclamation device, it is intended that all matters contained in the foregoing construction or shown in the accompanying drawings shall be interpreted as illustrative and not in a limiting sense.

It is also to be understood that the following claims are intended to cover all of the generic and specific features of this oil reclamation device herein described, and all statements of the scope of this oil reclamation device which, as a matter of language, might be said to fall therebetween.

I claim:

1. An oil reclamation device for removing impurities and contaminants from oil comprising:

a housing defining a first chamber, said housing comprising a base, said first chamber comprising at least one side wall, second evaporation chamber disposed within said first chamber and a lid releasably attached to said side wall of said first chamber.

said lid further comprising a projection having a sidewall;

an inlet in operative connection with said first chamber permitting flow of oil into said first chamber from an oil source outside of said housing, said first chamber comprising a filter wherein oil is introduced at a first pressure;

said second evaporation chamber comprising at least one second chamber sidewall parallel to the adjacent side wall of said lid providing an oil metering orifice for controlling the flow of oil from the first chamber to the second chamber, the pressure being lower in the second chamber than said first chamber;

said metering orifice is provided by a gap between said lid projection and second chamber sidewall, said gap being dimensioned to provide oil to pass through the gap at a predetermined rate;

said second evaporation chamber comprising at least one sidewall providing contaminate removal and a vent for venting airborne contaminates therefrom; and an outlet from said second evaporation chamber to remove reclaimed oil from said chamber.

2. An oil reclamation device for removing impurities and contaminates from lubricating oils, comprising:

a housing comprising a base, at least one sidewall constructed and arranged so as to have a first end and a second open end, the first end of said sidewall mounted to said base and projecting from said base;

a second sidewall constructed and arranged so as to have a first end and a second open end, said second sidewall located within said housing with the first end of said second sidewall mounted to said base and projecting from said base; at least one second chamber sidewall whereupon volatiles in the oil are released into the air within the second chamber; and a first chamber within said housing, the base defining a lower limit thereof, the lid defining an upper limit thereof, the sidewall defining an outermost periphery thereof;

a second chamber within said housing, the base defining a lower limit thereof, the lid defining an upper limit thereof, the second sidewall defining an outermost periphery thereof;

the lid further comprising a projection, having at least one sidewall;

an oil metering orifice comprised of at least one sidewall of the lid and at least one sidewall of the second chamber, forming a gap between said sidewalls to control the flow of oil from the first chamber to the second chamber, the oil in the second chamber having a lower pressure than the oil in the first chamber;

an inlet positioned to allow passage of oil from an oil source outside the housing into the first chamber, said oil in the first chamber having a pressure;

a drain in the second chamber to allow passage of oil outside the housing; and a vent in the second chamber to allow passage of volatiles from said second chamber to a location outside the housing.

3. The apparatus of claim 2, further comprising a filtering means in the first chamber to remove particulate contaminates as said oil flows through the first chamber.

* * * * *